(12) United States Patent
Fernandez

(10) Patent No.: US 11,418,324 B1
(45) Date of Patent: Aug. 16, 2022

(54) ENCRYPTION OF STANDALONE DATA PACKAGES

(71) Applicant: AgilePQ, Inc., South Jordan, UT (US)

(72) Inventor: Sergio A. Fernandez, San Diego, CA (US)

(73) Assignee: AgilePQ, Inc., South Jordan, UT (US)

( * ) Notice: Subject to any disclaimer, the term of this patent is extended or adjusted under 35 U.S.C. 154(b) by 342 days.

(21) Appl. No.: 16/595,463

(22) Filed: Oct. 7, 2019

Related U.S. Application Data

(60) Provisional application No. 62/884,066, filed on Aug. 7, 2019.

(51) Int. Cl.
| | | |
|---|---|---|
| *H04L 29/06* | (2006.01) | |
| *H04L 9/06* | (2006.01) | |
| *H04L 9/40* | (2022.01) | |
| *G06F 7/58* | (2006.01) | |

(52) U.S. Cl.
CPC ........ *H04L 9/0662* (2013.01); *H04L 63/0428* (2013.01); *G06F 7/582* (2013.01)

(58) Field of Classification Search
CPC .............................. H04L 63/0428; G06F 7/582
USPC ....................................................... 713/160
See application file for complete search history.

(56) References Cited

U.S. PATENT DOCUMENTS

| | | | | |
|---|---|---|---|---|
| 5,923,664 | A * | 7/1999 | Aldebert | H04Q 11/0478 370/465 |
| 6,052,786 | A * | 4/2000 | Tsuchida | H04L 9/0662 380/37 |
| 7,039,851 | B2 * | 5/2006 | Wang | H04L 12/437 714/776 |
| 7,877,597 | B2 * | 1/2011 | Hariharan | H04L 63/0435 713/153 |
| 8,386,765 | B2 * | 2/2013 | Fries | H04L 63/123 713/150 |
| 8,386,794 | B2 * | 2/2013 | Kang | G06K 19/073 713/181 |
| 9,137,212 | B2 * | 9/2015 | De Jong | H04L 63/0428 |
| 9,866,538 | B2 * | 1/2018 | Wang | H04L 63/0457 |
| 10,536,269 | B2 * | 1/2020 | Dolev | H04L 9/0656 |

* cited by examiner

*Primary Examiner* — Amare F Tabor
(74) *Attorney, Agent, or Firm* — Dentons Durham Jones Pinegar

(57) ABSTRACT

This disclosure relates generally to techniques for encrypting and decrypting data and to systems that encrypt and/or decrypt data to maintain secrecy associated with such data as the data is transmitted from a source to one or more recipients. More specifically, this disclosure relates to techniques for encrypting and decrypting standalone data packages (e.g., user datagram protocol (UDP) data packages, etc.) and to systems that encrypt and/or decrypt standalone data packages. Even more specifically, encryption techniques are disclosed that employ scrambled headers and payloads that are uniquely encrypted from package to package.

26 Claims, 1 Drawing Sheet

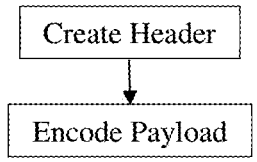
FIG. 1
FIG. 2
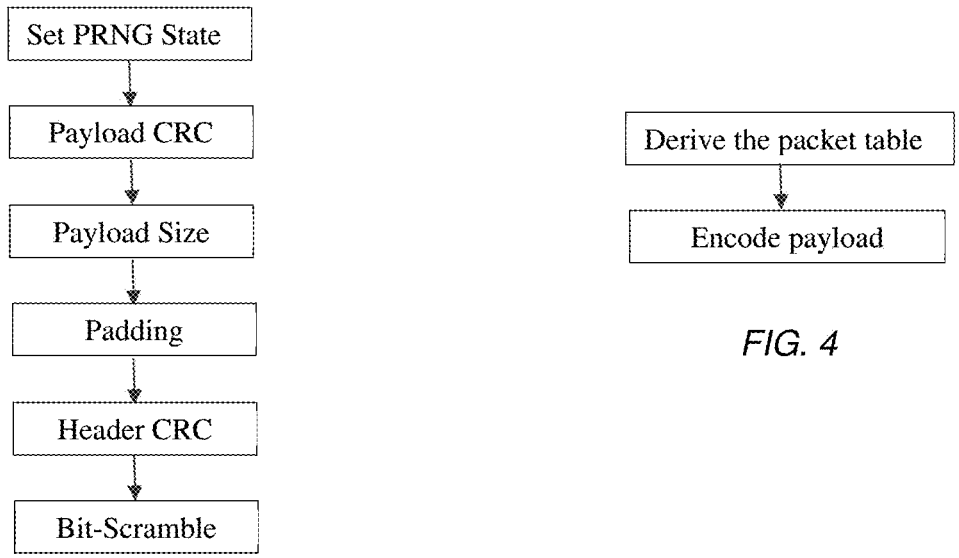
FIG. 3
FIG. 4

ENCRYPTION OF STANDALONE DATA PACKAGES

CROSS-REFERENCE TO RELATED APPLICATIONS

A claim for the benefit of priority to the Aug. 7, 2018 filing date of U.S. Provisional Patent Application No. 62/715,440, titled ENCRYPTION OF STANDALONE DATA PACKAGES ("the '440 Provisional Application"), is hereby made pursuant to 35 U.S.C. § 119(e). A claim for the benefit of priority to the Aug. 7, 2019 filing date of U.S. Provisional Patent Application No. 62/884,066, titled ENCRYPTION OF STANDALONE DATA PACKAGES ("the '066 Provisional Application"), is also made pursuant to 35 U.S.C. § 119(e).

This application is also related to U.S. patent application Ser. No. 15/614,328, filed on Jun. 5, 2017, titled DATA CONVERSION SYSTEMS AND METHODS, and published as U.S. Patent Application Publication US 2017/0353302 A1 on Dec. 7, 2017 ("the '328 Application"). The '328 Application includes claims under 35 U.S.C. § 119(e) for the benefit of priority to the filing dates of the following U.S. provisional patent applications: U.S. Provisional Patent Application No. 62/346,451, filed on Jun. 6, 2016 ("the '451 Provisional Application"); U.S. Provisional Patent Application No. 62/354,615, filed on Jun. 24, 2016 ("the '615 Provisional Application"); U.S. Provisional Patent Application No. 62/376,876, filed on Aug. 18, 2016 ("the '876 Provisional Application"); U.S. Provisional Patent Application No. 62/401,609, filed on Sep. 29, 2016 ("the '609 Provisional Application"); and U.S. Provisional Patent Application No. 62/438,443, filed on Dec. 22, 2016 ("the '443 Provisional Application").

The entire disclosures of the '066 Provisional Application, the '440 Provisional Application, the '328 Application, the '451 Provisional Application, the '615 Provisional Application, the '876 Provisional Application, the '609 Provisional Application, and the '443 Provisional Application are hereby incorporated herein.

TECHNICAL FIELD

This disclosure relates generally to techniques for encrypting and decrypting data and to systems that encrypt and/or decrypt data to maintain secrecy associated with such data as the data is transmitted from a source to one or more recipients. More specifically, this disclosure relates to techniques for encrypting and decrypting standalone data packages (e.g., user datagram protocol (UDP) data packages, etc.) and to systems that encrypt and/or decrypt standalone data packages. Even more specifically, encryption techniques are disclosed that employ scrambled headers and payloads that are uniquely encrypted from package to package.

RELATED ART

An attacker may be able to derive an encryption key for encrypted data if the encryption key remains constant and there is little or no variation in payload from data package to data package. For example, if several images of a blank screen of video are transmitted in sequence (e.g., the data consists primarily of zeros (0) with one or a few ones (1), etc.) or if the payload of every data package includes identifiable common information, it may be possible for an attacker to determine the encryption key for those data packages. To illustrate this point, during World War II the German armed forces' use of a common phrase at the end of every communication ultimately enabled Allied code breakers to decipher encrypted communications amongst German armed forces.

The sequential (TCP/IP) encryption/de-encryption algorithms described in U.S. Patent Application Publication US 2017/0353302 A1 (the '328 Application) use a pseudo-random number generator (PRNG) to bit scramble data to obfuscate the data. The party transmitting the data and the intended recipient of the data may be in lock-step to encode and decode the data, with an encryption table being rotated in lock-step after every package is sent and received. By constantly changing the encryption key in this manner, it is much more difficult for an attacker to determine the encryption key for any of the packages. However, the techniques disclosed by the '328 Application must be conducted in sequence. When data packages are not received in sequence, the intended recipient may not be able to decrypt any data package that has been received out of its intended sequence.

SUMMARY

There are many applications where it is convenient to allow the transmission of standalone data packages (or, more simply, "data packages") (e.g., user datagram protocol (UDP) data packages, etc.) where there is no guarantee that a series of the standalone data packages will be delivered in their intended order, or that the standalone data packages will be delivered at all. A technique for encrypting and decrypting data, including standalone data packages, in accordance with this disclosure includes receiving a plurality of standalone data packages. Each of the standalone data packages may be encrypted uniquely from (e.g., with an encryption key that is unique from, etc.) the encryption of every other standalone data package of the plurality of standalone data packages received by the intended recipient(s).

Encryption that is unique from data package to data package may be accomplished by creating a unique header for each standalone data package of the plurality of standalone data packages. A unique header may be generated by use of a pseudo random number generator (PRNG) to provide a PRNG value that defines a PRNG state that will be unique or substantially unique (as duplicate values may be obtained from the PRNG) for a particular (each) standalone data package. The payload of the standalone data package may be subjected to a cyclic redundancy check (CRC), and the CRC may generate a payload CRC value. The payload CRC value may also vary from one standalone data package to another, depending upon the uniqueness of the payload of each standalone data package. The payload CRC value may be appended to the PRNG value to define a portion of a unique header data string for the corresponding standalone data package. In some embodiments, a payload size value, which corresponds to a length or size of the payload, may also be included in the unique header data string for the standalone data package. "Padding" or "salting," which may comprise randomly generated data or pseudo randomly generated data, may also be a part of the unique header data string that includes the PRNG value and the payload CRC value for a particular standalone data package. The amount of padding or salting that is added to the unique header data string may correspond to a total length or size of the unique header data string. The unique header data string may have a set length or size (e.g., 32 bytes, 32 bytes or less, etc.). Once the PRNG value, the payload CRC value, the optional payload size value, and any padding or salting have been added to the unique header data string, the unique header data string may be subjected to a CRC. The resulting value, a header CRC value, may then be appended to the unique header data string, defining a remainder of the unique header data string and, thus, the header for a particular payload of the standalone data package.

Once the unique header for the payload of a particular standalone data package is complete, it may be scrambled. Scrambling of the unique header may comprise use of a header encryption key that is shared between a source of the standalone data package (i.e., the encryption source) and each recipient of the standalone data package (e.g., each intended recipient of the standalone data package, etc.). That shared header key may be constant from one standalone data package to another, or it may be varied in a manner that is coordinated, or synchronized, between the source of the standalone data package and each recipient of the standalone data package. In some embodiments, the unique header for each standalone data package may be bit scrambled.

In some embodiments, the payload of the standalone data package may be padded or salted. The payload of the standalone data package may be padded or salted with randomly generated or pseudo randomly generated data prior to encryption. Padding or salting ensures that the payload of one standalone data package is unique from the payloads of other standalone data packages. The payload and the padding or salting may be XOR'd.

The PRNG value, which defines the PRNG state, may be used in connection with an encryption table shared between the source of the standalone data package and each recipient of the standalone data package (e.g., each intended recipient of the standalone data package, etc.). The '328 Application discloses embodiments of encryption tables, as well as their generation and use, that may be used in accordance with this disclosure. The shared encryption table may be constant or it may be varied in a manner that is coordinated, or synchronized, between the source of the standalone data package and each recipient of the standalone data package. The PRNG state may determine the manner in which the shared encryption table is to be manipulated (e.g., chained, etc.) to define a unique encryption table for the data package, or a "package-specific encryption table." The package-specific encryption table is then used to encrypt the payload of the data package.

The payload of the standalone data package may be encrypted in any of a variety of ways. Without limitation, the payload may be subjected to bit scrambling, byte scrambling, or word scrambling. The manner in which the payload is encrypted may depend on its size (e.g., its original, pre-padded or pre-salted size; its padded or salted size, etc.). As an example, a payload with a size of less than 256 bytes may be bit scrambled, while a payload with a size of 256 bytes to 1,028 bytes may be byte scrambled, and a payload with a size of greater than 1,028 bytes may be word scrambled.

Together, the scrambled header and the encrypted payload comprise a uniquely encrypted standalone data package. The uniquely encrypted standalone data package may be transmitted, or sent, from the source to one or more recipients (e.g., intended recipients, etc.). Each intended recipient, who has the shared header key, may use the shared header key to unscramble the scrambled unique header of the standalone data package. With the unique header unscrambled, the recipient may subject the unique header data string, less the header CRC value, to a CRC to generate a second header CRC value. The second header CRC value may then be compared with the original header CRC value obtained from the unscrambled unique header to confirm that the integrity of the unique header was maintained during transmission and unscrambling of the standalone data package. If the second header CRC value and the original header CRC value match, the recipient may then obtain other data from the unique header to aid in the process of the decrypting the payload of the uniquely encrypted standalone data package.

The PRNG value from the unique header may enable the recipient to determine the manner in which the shared encryption table is to be manipulated to derive the package-specific encryption table from the shared encryption table. In embodiments where the manner of encryption is based at least in part up on the size of the payload, the payload size value from the unique header may also be used to decrypt the payload. Once the package-specific encryption table has been derived by the recipient and, if necessary, the payload size has been taken into account, the recipient may use the package-specific encryption table to decrypt the payload. The decrypted payload may then be subjected to CRC to generate a second payload CRC value. The second payload CRC value may then be compared with the original payload CRC value from the unique header to confirm that the integrity of the payload was maintained during transmission and decryption of the standalone data package. If the second payload CRC value and the original payload CRC value match, the decrypted payload may be subjected to further processing or used by the recipient.

In embodiments where the payload has been padded or salted, the padding or salting may be removed from the decrypted payload. Removal of the padding or salting may be performed by XORing the decrypted payload, obtaining a payload size value from the header, and determining which portion of the decrypted, XOR'd payload corresponds to the payload size value. The remaining data, which comprises padding or salting, may be disregarded, while the payload may be used by the recipient.

In another aspect, a communications device may be capable of creating an encrypted standalone data package in accordance with the above-described encryption techniques. Such a communications device may include a processor and a memory medium (e.g., a non-transient computer-readable memory medium, etc.). The memory medium, which can communicate with the processor, may store instructions capable of causing the processor to executing any of the above-described techniques. Once the processor executes the instructions, it may cause a communications interface of the communications device to transmit the encrypted standalone data package to one or more recipients.

Each intended recipient of a standalone data package that has been encrypted in accordance with this disclosure may employ a communications interface that communicates with a processor, as well as a memory medium (e.g., a non-transient computer-readable memory medium, etc.) in communication with the processor. Upon receiving an encrypted standalone data package, the processor may communicate with the memory medium to access instructions from the memory medium. Upon executing the instructions, the processor may decrypt the standalone encrypted data package in accordance with the above-described decryption techniques.

A system for securely transmitting data may include a communications device and one or more recipients.

Other aspects of the disclosed subject matter, as well as features and advantages of various aspects of the disclosed subject matter, will become apparent to those of ordinary skill in the art through consideration of the ensuing description and the appended claims.

BRIEF DESCRIPTION OF THE DRAWINGS

In the drawings:

FIG. 1 is a flow diagram illustrating an embodiment of a process for encrypting a standalone data package;

FIG. 2 schematically represents a format for a unique header to be used with a standalone data package;

FIG. 3 depicts an embodiment of process flow for creating a unique header, such as that depicted by FIG. 2, for a standalone data package; and FIG. 4 depicts an embodiment of process flow for encoding the payload of a standalone data package once the unique header has been created for the standalone data package.

DETAILED DESCRIPTION

FIG. 1 illustrates an embodiment of a method for encrypting a data package, which may also be referred to herein as an "encryption method 10." In a specific embodiment, the data package may comprise a UDP data package. The data package may be a standalone data package, which may be transmitted independently from other data packages or as a group of data packages. As illustrated, the encryption method 10 may include creating of a unique header for a data package, which occurs at reference 20 of FIG. 1, as well as encoding the payload of the data package, which occurs at reference 60 of FIG. 1. Creating the unique header may occur before encoding the payload of the data package, as depicted by FIG. 1.

Creating the unique header, at reference 20 of FIG. 1, may include creating a unique header of any desired or suitable length. In some embodiments, that length may be 32 bytes. In other embodiments, a unique header with a length of less than 32 bytes may be created. In still other embodiments, the unique header may have a length that exceeds 32 bytes.

FIG. 2 depicts an embodiment of a unique header 22 that may be created at reference 20 of FIG. 1. The unique header 22 may include a header CRC value 24, a payload CRC value 26, a PRNG value 28, a payload size value 30, and optional padding 32, or salting. The data that makes up the unique header for a particular data package may be different from the data that makes up unique headers for all other data packages, including other data packages that may be transmitted in connection with transmission of the particular data package and/or other data packages that are transmitted between a particular source and one or more particular intended recipients. The distinctiveness of a unique header for a particular data package may make increase the security associated with, and prevent exposure of, a secret key used to scramble the unique header.

An embodiment of a process for generating a unique header 22 (FIG. 2) for a data packet 40 will now be described in reference to the flow chart of FIG. 3. At reference 42, a PRNG state is set. At reference 44, the CRC of the payload of the data packet is calculated and used as the payload CRC value 26 (FIG. 2) of the unique header 22. At reference 46, the size of the payload is used as the payload size value 30 (FIG. 2) of the unique header 22. At reference 48, padding 32 (FIG. 2) may be added to the unique header 22. At reference 50, the CRC of the previously formed portions of the unique header 22 may be calculated and used as the header CRC value 24 (FIG. 2) of the unique header 22. At reference 52, the unique header 22 may be scrambled. In a specific embodiment, the acts shown in FIG. 3 may be conducted in the order shown in FIG. 3.

It may also be possible to generate a unique header 22 by conducting these acts in an order that differs from that shown in FIG. 3.

The PRNG state may be set, at reference 42, by changing the existing state of the PRNG. As a specific, but nonlimiting example the then-existing PRNG state may be moved forward a random number of locations to a new PRNG state. As another example, in embodiments where the PRNG has sufficient computational resources, the PRNG state may randomly jump to a new location, or state, within the PRNG, as described in further detail in the '328 Application. In yet another example, a new PRNG state may be set by generating a polynomial, which determines the new location within the PRNG to which the PRNG state will jump, as described in further detail in the '328 Application. Since the PRNG state varies with each unique header and, thus, with each data package, the encryption keys used to encrypt and decrypt each data package may be protected from attacks.

Calculation of the payload CRC value 26 (FIG. 2), at reference 44 of FIG. 3, may be conducted in any suitable manner known in the art. Determination of the payload size value 30 (FIG. 2), at reference 46 of FIG. 3, may also be conducted in any suitable manner known in the art.

The padding 32 (FIG. 2) of the unique header 22 (FIG. 2), at reference 48 of FIG. 3, may also be generated in a manner known in the art. The padding 32 may comprise pseudo-randomly generated data (e.g., numbers, etc.) or randomly generated data (e.g., numbers, etc.). Although depicted by FIG. 2 as appearing at an end of the unique header 22, the padding 32, if any, may be located elsewhere along the data string that makes up the unique header 22 and, in some embodiments, may be interspersed between or within other elements of the unique header 22 (i.e., the header CRC value 24, the payload CRC value 26, the PRNG value 28, and/or the payload size value 30). The total number of bytes of padding 32 included in the unique header 22 may dictate the length of the unique header 22, which may provide for uniformity in the lengths of unique headers 22 for all of the data packages that are to be transmitted as part of a group or all of the data packages that are to be transmitted between a particular source and one or more particular intended recipients.

At reference 50 of FIG. 3, the header CRC value 24 (FIG. 2) may be calculated in a manner known in the art.

Scrambling of the unique header 22 (FIG. 2) is conducted at reference 52 of FIG. 3. The unique header 22 may be bit scrambled. Scrambling of the unique header 22 may be conducted with a table known only to the source of the data package and to each intended recipient of the data package.

With returned reference to FIG. 1, at reference 60, once a unique header 22 (FIG. 2) has been generated for a particular data package, an encryption method 10 may proceed to encoding the payload of the data package.

In some embodiments, the payload of the data package may be padded, or salted, with randomly generated numbers (e.g., randomly generated numbers, pseudo randomly generated numbers, etc.). In some embodiments, the payload of the data package may be exclusive OR'd (XOR'd).

The payload of the data package may also be scrambled. Scrambling of the data package may be conducted in any of a variety of ways. Without limitation, the payload may be subjected to bit scrambling, byte scrambling, or word scrambling. The manner in which the payload is encrypted may depend on the size of the payload (e.g., its original, pre-padded or pre-salted size; its padded or salted size, etc.). As an example, a payload with a size of less than 256 bytes may be bit scrambled, while a payload with a size of 256 bytes to 1,028 bytes may be byte scrambled, and a payload with a size of greater than 1,028 bytes may be word scrambled.

Once any padding, XOR'ing, and/or scrambling of the payload has been conducted, the payload may be encoded. FIG. 4 provides a flow diagram of an embodiment of a process for encoding the payload of a data package 62. At reference 64, a table for the data package may be derived. The payload may then be encoded at reference 66.

Derivation of the table at reference 64 may include chaining the secret table shared between the source of the data package and each intended recipient of the data package a predetermined number of time (e.g., 256 times). Chaining of the secret table may be conducted with data from the PRNG in the manner disclosed by the '328 Application. The chained table may be different for every data package.

With the secret table chained, encryption of the payload may be conducted with a sequential algorithm, such as that disclosed by the '328 Application.

Once a data package has been encrypted, it may be transmitted and received by its intended recipient. Each intended recipient may decrypt the data package by use of a shared header key, which may be used to unscramble the scrambled unique header of the standalone data package. With the unique header unscrambled, the recipient may subject the unique header data string, less the header CRC value, to a CRC to generate a second header CRC value. The second header CRC value may then be compared with the original header CRC value obtained from the unscrambled unique header to confirm that the integrity of the unique header was maintained during transmission and unscrambling of the standalone data package. If the second header CRC value and the original header CRC value match, the recipient may then obtain other data from the unique header to aid in the process of the decrypting the payload of the uniquely encrypted standalone data package.

The PRNG value from the unique header may enable the recipient to determine the manner in which the shared encryption table is to be manipulated to derive the package-specific encryption table from the shared encryption table. In embodiments where the manner of encryption is based at least in part up on the size of the payload, the payload size value from the unique header may also be used to decrypt the payload. Once the package-specific encryption table has been derived by the recipient and, if necessary, the payload size has been taken into account, the recipient may use the package-specific encryption table to decrypt the payload. The decrypted payload may then be subjected to CRC to generate a second payload CRC value. The second payload CRC value may then be compared with the original payload CRC value from the unique header to confirm that the integrity of the payload was maintained during transmission and decryption of the standalone data package. If the second payload CRC value and the original payload CRC value match, the decrypted payload may be subjected to further processing or used by the recipient.

In embodiments where the payload has been padded or salted, the padding or salting may be removed from the decrypted payload. Removal of the padding or salting may be performed by XORing the decrypted payload, obtaining a payload size value from the header, and determining which portion of the decrypted, XOR'd payload corresponds to the payload size value. The remaining data, which comprises padding or salting, may be disregarded, while the payload may be used by the recipient.

Since a unique secret table is derived for each data package, even if an attacker were to derive the secret table used to encrypt one data package, the attacker would not be able to use that secret table to decrypt any other data package.

Although the foregoing description sets forth many specifics, these should not be construed as limiting the scope of any of the claims, but merely as providing illustrations of some embodiments and variations of elements or features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. A communications device, comprising:
   a communications interface;
   a processor; and
   a memory medium coupled to the processor, the memory medium comprising a non-transient computer-readable memory medium, the memory medium capable of storing instructions capable of causing the processor to:
      obtain a number from a pseudo random number generator, the number comprising a pseudo random number generator state;
      create a header for each data package of a plurality of standalone data packages, the header for each data package being unique from the header for every other data package of the plurality of standalone data packages, the header including:
         the pseudo random number generator state;
         a payload cyclic redundancy check;
         padding, comprising randomly generated data; and
         a header cyclic redundancy check;
      scramble the header using a key shared between the processor and a recipient of each data package; and
      derive a package-specific encryption table from the pseudo random number generator state and a table shared between the processor and the recipient of each data package;
      encode a payload for each data package, the encoding occurring in accordance with the package-specific encryption table to provide an encrypted data package.

2. The communications device of claim 1, wherein the header further includes a payload size.

3. The communications device of claim 1, wherein the instructions are capable of causing the processor to scramble the header by bit scrambling the header using the shared key.

4. The communications device of claim 1, wherein the instructions are capable of causing the processor to create the header by creating a header with a size of 32 bytes or less.

5. The communications device of claim 1, wherein the instructions are capable of causing the processor to derive the package-specific encryption table by chaining the table shared between the processor and the recipient of each data package.

6. The communications device of claim 1, wherein the instructions are capable of causing the processor to encode the payload by bit scrambling, byte scrambling, or word scrambling.

7. The communications device of claim 1, wherein the instructions are capable of causing the processor to encode the payload on a basis of a payload size.

8. The communications device of claim 7, wherein the instructions are capable of causing the processor to encode the payload by bit scrambling if the payload size is less than 256 bytes.

9. The communications device of claim 7, wherein the instructions are capable of causing the processor to encode the payload by byte scrambling if the payload size is 256 bytes to 1,028 bytes.

10. The communications device of claim 7, wherein the instructions are capable of causing the processor to encode the payload by word scrambling if the payload size is greater than 1,028 bytes.

11. The communications device of claim 1, wherein each data package comprises a UDP package.

12. The communications device of claim 1, wherein the processor is capable of causing the communications interface to transmit the encrypted data package.

13. A computer-implemented method for encrypting and decrypting a plurality of standalone data packages, comprising:
  receiving the plurality of standalone data packages; and
  generating a plurality of encrypted data packages from the plurality of standalone data packages by:
    creating a header for each data package of the plurality of standalone data packages, the header for each data package being unique from the header for every other data package of the plurality of standalone data packages, the header including:
      a pseudo random number generator state;
      a payload cyclic redundancy check;
      padding, comprising randomly generated data; and
      a header cyclic redundancy check;
    scrambling the header using a key shared between a source and a recipient of each data package; and
    deriving a package-specific encryption table from the pseudo random number generator state and a table shared between the source of each data package and the recipient of each data package;
    encoding a payload for each data package, the encoding occurring in accordance with the package-specific encryption table to provide an encrypted data package.

14. The computer-implemented method of claim 13, wherein creating the header comprises creating the header to include a package size.

15. The computer-implemented method of claim 13, wherein scrambling the header comprises bit scrambling the header using the shared key.

16. The computer-implemented method of claim 13, wherein creating the header comprises creating a header with a size of 32 bytes or less.

17. The computer-implemented method of claim 13, wherein deriving the package-specific encryption table comprises chaining a shared table with pseudo random data generated based on the pseudo random number generator state.

18. The computer-implemented method of claim 13, wherein encoding the payload data comprises bit scrambling, byte scrambling, or word scrambling.

19. The computer-implemented method of claim 13, wherein encoding the payload occurs on a basis of a payload size.

20. The computer-implemented method of claim 19, wherein encoding the payload comprises bit scrambling if the payload size is less than 256 bytes.

21. The computer-implemented method of claim 19, wherein encoding the payload comprises byte scrambling if the payload size is 256 bytes to 1,028 bytes.

22. The computer-implemented method of claim 19, wherein encoding the payload comprises word scrambling if the payload size is greater than 1,028 bytes.

23. The computer-implemented method of claim 13, wherein each data package comprises a UDP package.

24. The computer-implemented method of claim 13, further comprising: transmitting the encrypted data package.

25. The computer-implemented method of claim 24, further comprising: receiving the encrypted data package.

26. The computer-implemented method of claim 25, further comprising:
  using the key to unscramble the header; and
  using the pseudo random number generator state to derive a package table from the table shared between the source of each data package and the recipient of each data package; and
  using the package table to decrypt the encrypted data package.

* * * * *